United States Patent
Vasseur et al.

(10) Patent No.: US 9,794,145 B2
(45) Date of Patent: Oct. 17, 2017

(54) SCHEDULING PREDICTIVE MODELS FOR MACHINE LEARNING SYSTEMS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 14/591,079

(22) Filed: Jan. 7, 2015

(65) Prior Publication Data

US 2016/0028599 A1    Jan. 28, 2016

Related U.S. Application Data

(60) Provisional application No. 62/028,217, filed on Jul. 23, 2014.

(51) Int. Cl.
*H04L 12/26* (2006.01)
*H04L 12/24* (2006.01)

(52) U.S. Cl.
CPC ............ *H04L 43/08* (2013.01); *H04L 41/145* (2013.01); *H04L 41/147* (2013.01); *H04L 41/16* (2013.01)

(58) Field of Classification Search
USPC ................................ 370/230–324; 706/12–59
See application file for complete search history.

(56) References Cited

U.S. PATENT DOCUMENTS

| | | | |
|---|---|---|---|
| 6,973,622 B1 * | 12/2005 | Rappaport | H04L 41/145 703/21 |
| 7,081,823 B2 | 7/2006 | Gluhovsky et al. | |
| 7,519,566 B2 * | 4/2009 | Prigogin | G06Q 10/06 706/21 |
| 7,945,497 B2 * | 5/2011 | Kenefick | G06Q 40/08 705/35 |
| 8,370,280 B1 * | 2/2013 | Lin | G06N 99/005 706/12 |
| 8,554,703 B1 * | 10/2013 | Lin | G06N 99/005 706/12 |
| 8,706,651 B2 * | 4/2014 | Horvitz | G06N 99/005 706/12 |
| 8,868,472 B1 * | 10/2014 | Lin | G06N 99/005 706/12 |
| 2003/0225775 A1 * | 12/2003 | Kirovski | G06F 9/3802 |
| 2011/0246406 A1 * | 10/2011 | Lahav | G06Q 30/02 706/46 |
| 2012/0303413 A1 | 11/2012 | Wang et al. | |

(Continued)

*Primary Examiner* — Man Phan
(74) *Attorney, Agent, or Firm* — Parker Ibrahim & Berg LLC; James M. Behmke; Stephen D. LeBarron

(57) ABSTRACT

In one embodiment, a device in a network monitors performance data for a first predictive model. The first predictive model is used to make proactive decisions in the network. The device maintains a supervisory model based on the monitored performance data for the first predictive model. The device identifies a time period during which the supervisory model predicts that the first predictive model will perform poorly. The device causes a switchover from the first predictive model to a second predictive model at a point in time associated with the time period, in response to identifying the time period.

18 Claims, 12 Drawing Sheets

(56) References Cited

U.S. PATENT DOCUMENTS

2014/0304211 A1* 10/2014 Horvitz ............... G06N 99/005
  706/52
2015/0295856 A1* 10/2015 Karthikeyan .......... H04L 65/80
  370/230

* cited by examiner

SCHEDULING PREDICTIVE MODELS FOR MACHINE LEARNING SYSTEMS

RELATED APPLICATIONS

This application claims priority to U.S. Provisional Application No. 62/028,217, filed Jul. 23, 2014, entitled: "SCHEDULING PREDICTIVE MODEL CENTRALIZED HISTORICAL DATA MINING," by Vasseur et al., the contents of which are herein incorporated by reference.

TECHNICAL FIELD

The present disclosure relates generally to computer networks, and, more particularly, to scheduling predictive models for machine learning systems in computer networks.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
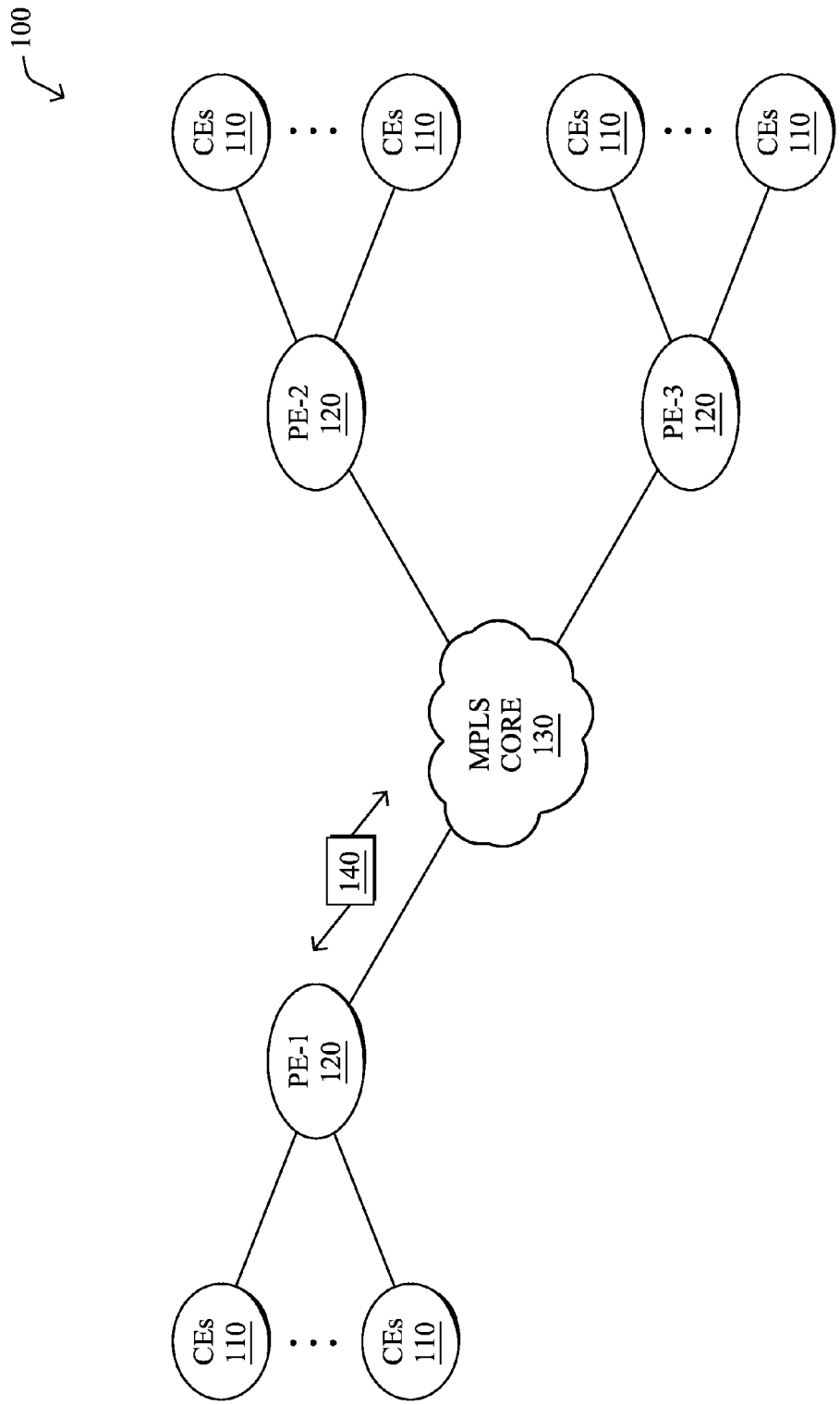
FIG. 1 illustrates an example communication network.

According to one or more embodiments of the disclosure, a device in a network monitors performance data for a first predictive model. The first predictive model is used to make proactive decisions in the network. The device maintains a supervisory model based on the monitored performance data for the first predictive model. The device identifies a time period during which the supervisory model predicts that the first predictive model will perform poorly. The device causes a switchover from the first predictive model to a second predictive model at a point in time associated with the time period, in response to identifying the time period.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point). Often, an IoT network is implemented with an LLN-like architecture.

Figure 2:
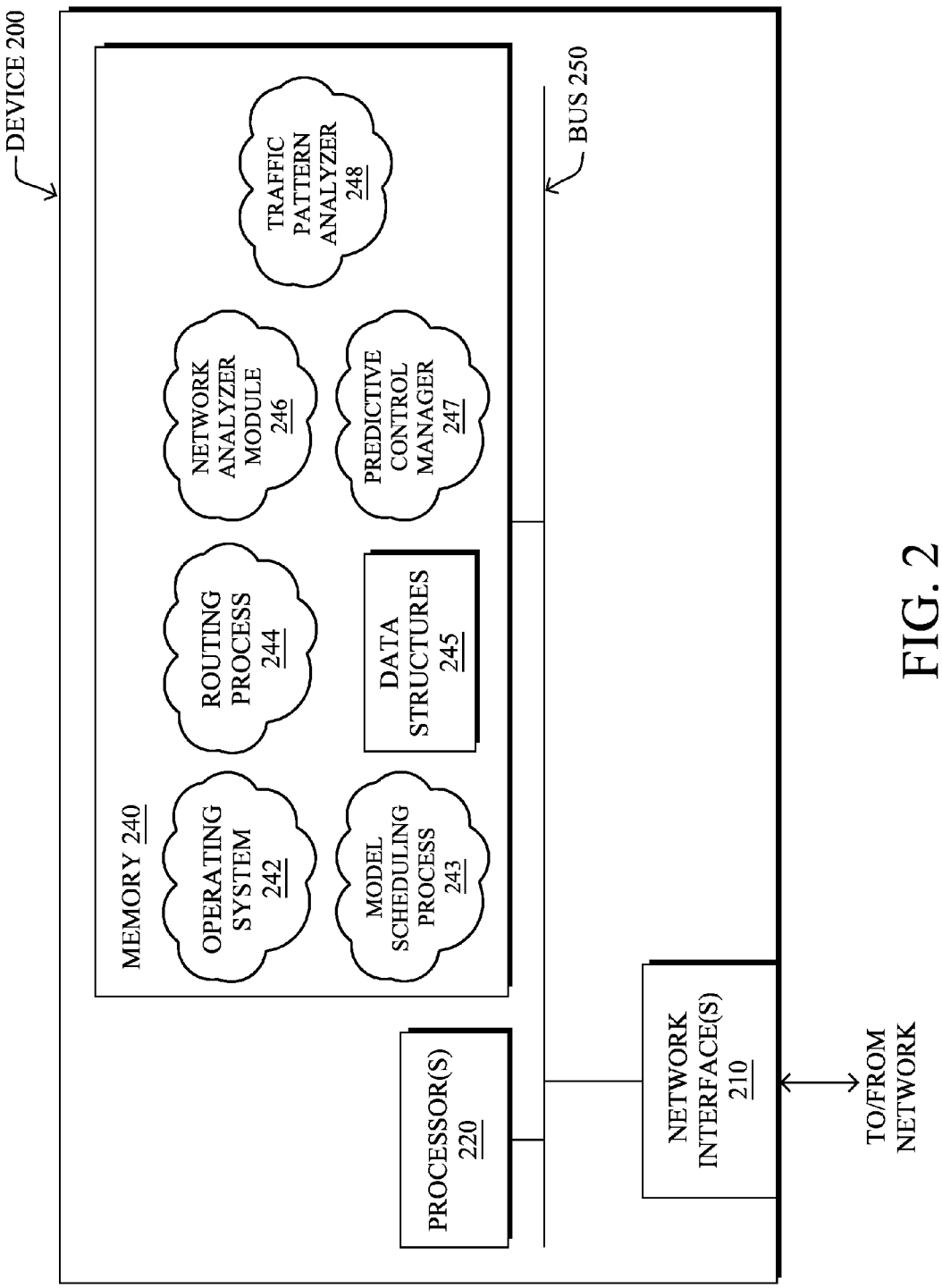
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, a network controller (e.g., a device associated with a network operations center (NOC)), or any other computing device that supports the operations of network 100 (e.g., switches, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network analyzer module (NAM) 246, a predictive control manager (PCM) 247, a traffic pattern analyzer (TPA) 248, and/or a model scheduling process 243, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performance in terms of connectivity and bandwidth.

Figure 3:
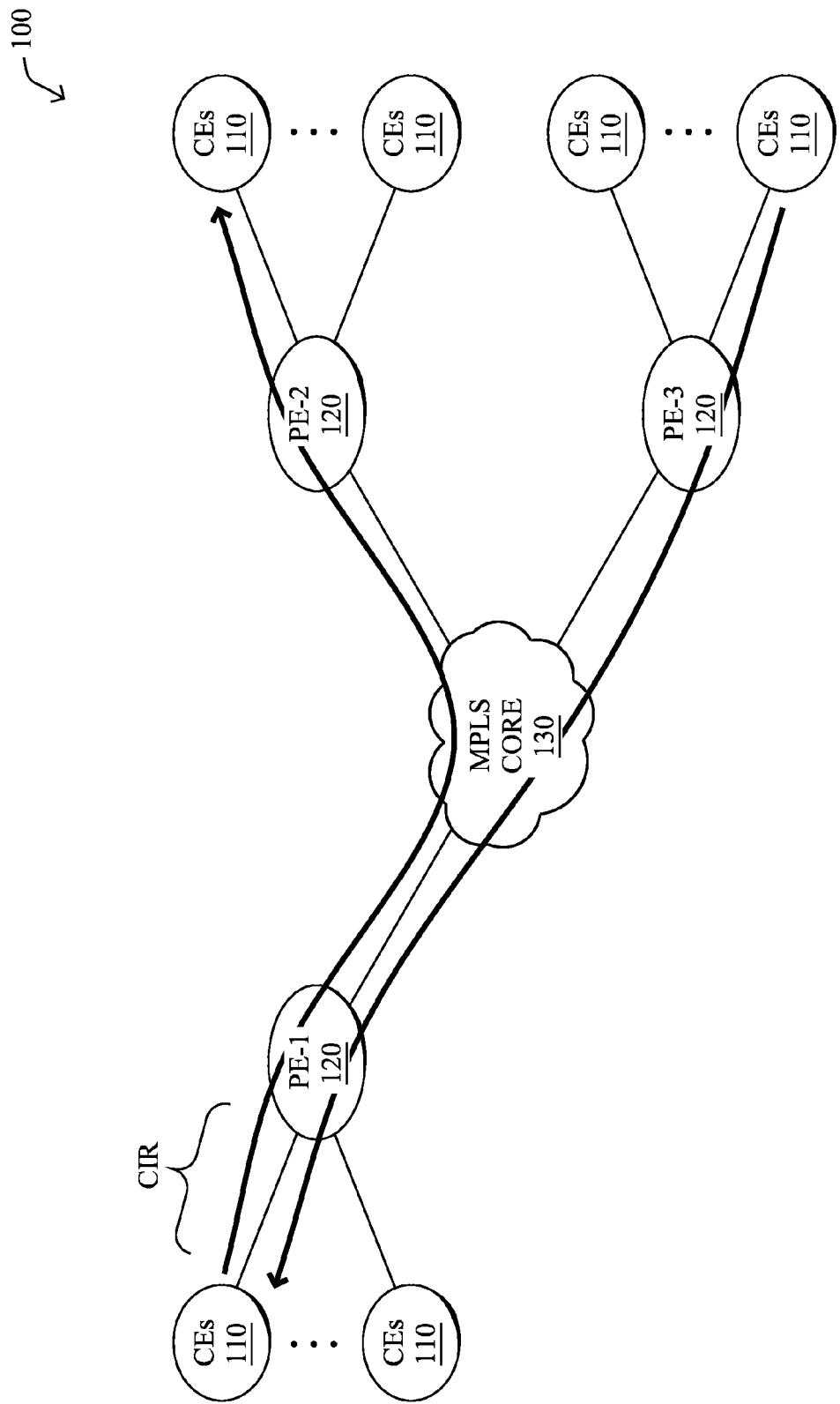
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. Many networking mechanisms exist today to provide on-the-fly guaranteed network performance, such as call admission control, resource reservation, queuing, traffic shaping, etc. However, these tools require careful engineering to perform highly complex tasks in terms of traffic classification, QoS, routing, network and application SLA monitoring, etc. in view of the highly dynamic nature of the traffic and the network. All combined, these techniques make the configuration of a network extremely complicated, while still relying on the fundamental paradigm of reactive networking.

Reactive networking has been the traditional network-engineering paradigm for the past three decades: indeed, policies and rules-based actions are first to determine the required Service Level Agreement (SLA) and the traffic is then classified (colored) using the DSCP field either by the application itself or input routers such as due to Deep Packet Inspection. Routing engineering is a true manual operation. Tunnels are set using various automated mechanisms to ensure security, and traffic monitoring is then performed in order to verify that the required SLAs are indeed met. As pointed out above, new performance-based routing approaches have been designed, but are fundamentally reactive: once the traffic is routed over a specific (pre-determined path), alarms are dynamically generated by the remote end upon SLA violation that may trigger the rerouting of the traffic.

A different approach to reactive routing, however, consists in relying on the concept of predictive networking whereby network analytics is used in order to predict traffic patterns and networks characteristics using machine-learning algorithms. Such an approach is a fundamental paradigm shift contrasting with existing approaches and allowing for non a priori rules-based, manual configuration, significantly more optimal network decisions (for QoS, routing, etc.), predictive performance and thus a significant reduction of risk of violating application SLAs and a significant improvement in terms of "ease of use" for the end user, as well as shorter networking tuning cycles when new applications are enabled in the network.

In particular, according to various embodiments herein, a predictive performance methodology for WANs and other forms of networks is introduced that that allows for its use across varying network architectures, application requirements, and deployment strategies, as well as in the presence of dynamic traffic and network performance. As detailed below, such an architecture may make use of machine learning techniques, in some embodiments, to evaluate future network requirements and performance, and to take corrective measures within the network to ensure the SLAs are met.

According to various embodiments described herein, a dynamic, predictive performance architecture is disclosed that may be implemented in a network, such as a multi-service, multi-carrier WAN. In particular, NAM 246, PCM 247, and/or TPA 248, may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. In various implementations, processors 244 and 246-248 may be co-located or may be distributed across different network devices. Further, while certain functions are described herein with respect to a particular one of processors 244, 246-248, the functions may be incorporated into any of the other processors, in various other embodiments.

Figure 4A:
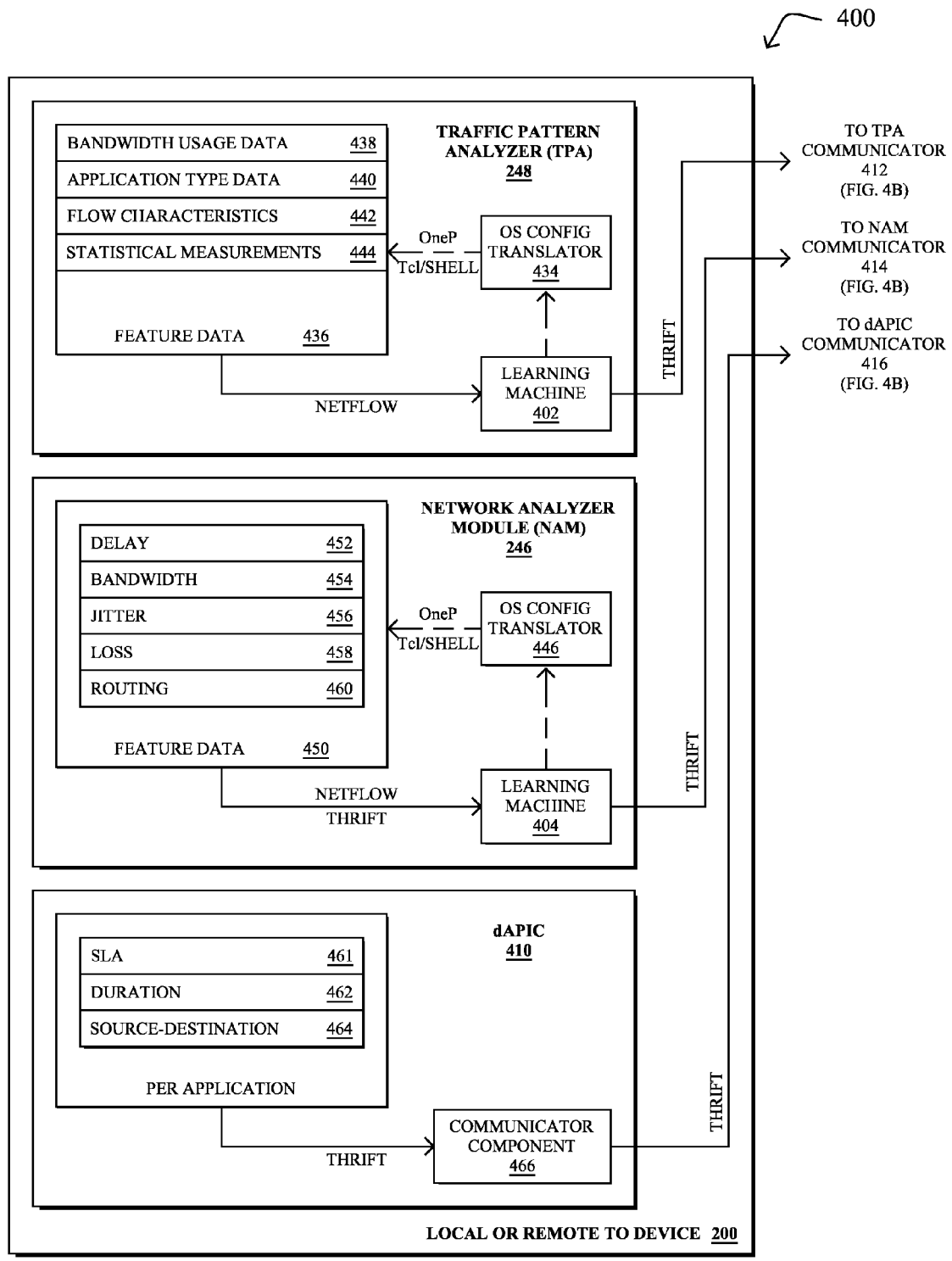
FIGS. 4A-4B illustrate an example architecture for predictive networking.
Figure 4B:
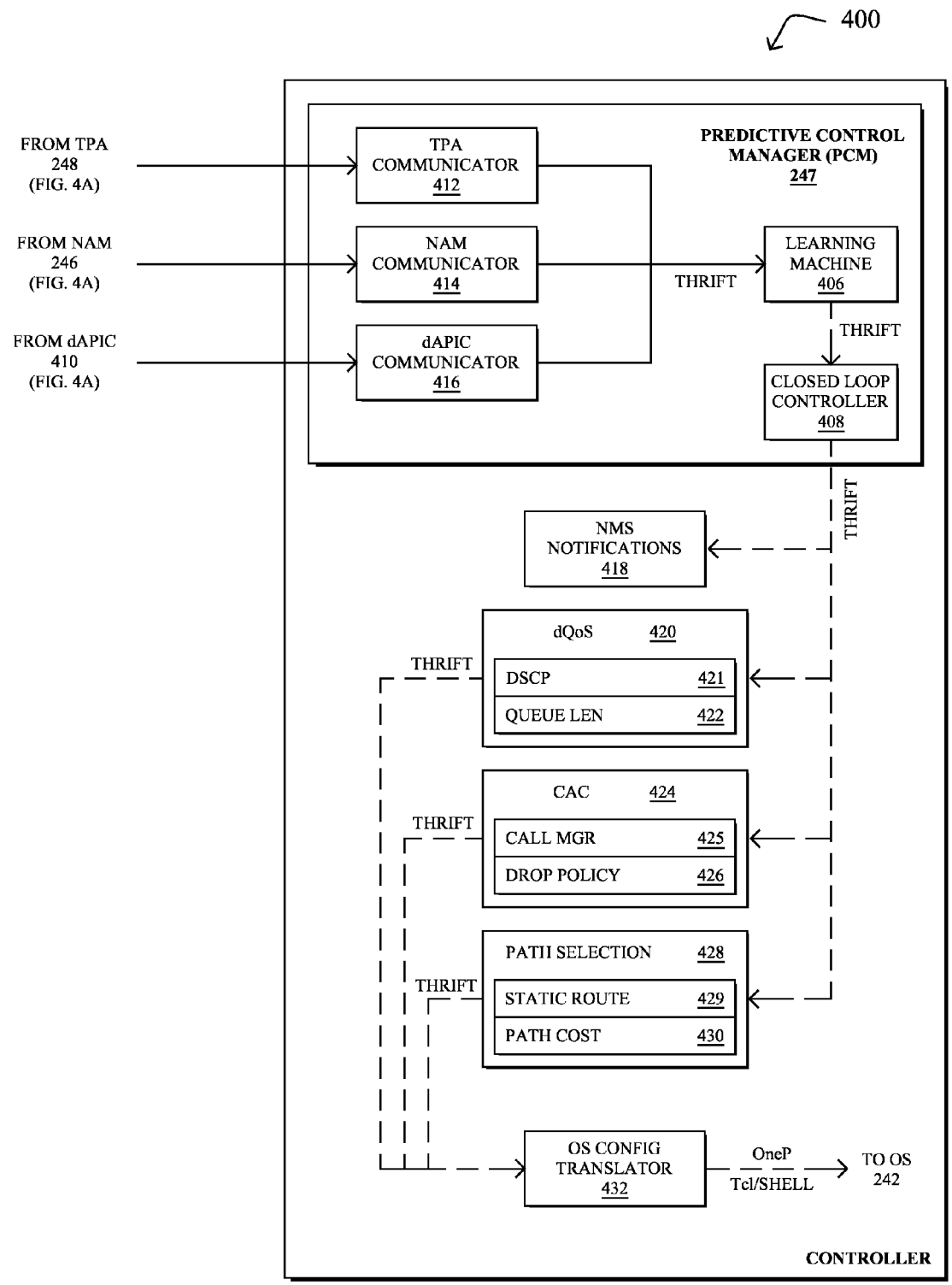

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processors for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following source: (1) SLA processors may yield data about the delay, jitter and packet loss, which can, in some circumstance, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processors can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 461 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 461-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 461), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

As noted above, predictive models based on time series of input data (e.g., traffic, bandwidth, other network properties, etc.) are among the set of mechanisms that may be used in next-generation, multiservice, multicarrier WANs. However, such networks may require a significant diversity of timescales, ranging from the microsecond range at the packet level up to yearly or seasonal events (e.g., Black Friday in the case of a retail company, etc.). However, it may be impractical to train models that can make relevant predictions across all of these time scales. In addition, a predictive model trained at a given time scale (e.g., for making predictions one minute into the future) may be valid only under certain circumstances or at specific times. Further, in the above Self Learning Networks (SLN) architecture, storage may be distributed. Although in many circumstances data storage may be performed on the device hosting the predictive process, the storage of higher volumes of data may be required to identify long-term seasonality or other conditions.

Scheduling Predictive Models

The techniques herein provide for the scheduling of predictive models based on one or more higher-level time-series models (e.g., a time-series model that uses a larger time scale than that of a lower-level time-series model). Such predictive models may be determined a priori using available offline data or from the occurrence of an event prior to the system entering a learning mode. In particular, the techniques herein schedule predictive models for machine learning systems. For example, a given predictive model using a time series may be perfectly valid during some period of time (e.g., during office hours), and completely inaccurate at another period of time (e.g., during the night). It is often very difficult, even impossible in some cases, to build a predictive model that can capture the sheer variation of the network dynamics on much larger time scales than that of its predictions. To this end, the techniques herein schedule models dynamically based on the predictions of a higher-level model, which operates at a higher time-scale. This scheduling mechanism may be complemented by a change point analysis of the prediction error that can trigger a fallback to a backup, more conservative model, and/or to a user-defined policy.

Illustratively, the techniques described herein may be performed by hardware, software, and/or firmware, such as in accordance with the model scheduling process 243, which may include computer executable instructions executed by the processor 220 to perform functions relating to the techniques described herein. For example, the techniques herein may be treated as extensions to machine learning processes and protocols, and as such, may be processed by similar components understood in the art that execute those processes and protocols, accordingly.

Specifically, according to various embodiments, a device in a network monitors performance data for a first predictive model. The first predictive model is used to make proactive decisions in the network. The device maintains a supervisory model based on the monitored performance data for the first predictive model. The device identifies a time period during which the supervisory model predicts that the first predictive model will perform poorly. The device causes a switchover from the first predictive model to a second predictive model at a point in time associated with the time period, in response to identifying the time period.

Operationally, different predictive models may be used as part of a proactive/predictive networking mechanism at different times. For example, assume that there is a predictive model M predicting the traffic between a store and a datacenter of a retail company at a time scale of one minute (e.g., as part of learning machine 402). However, in the case of a retail store, the traffic dynamics may vary drastically between opening and closing hours. In such a case, the techniques herein may provide for the use of separate models $M_o$ and $M_c$, and coordinate the switchover between the two models (e.g., such that $M_o$ is active during opening hours and $M_c$ is active during closing hours).

Referring now to FIGS. 5A-5D, an example of predictive models being scheduled is shown, according to various embodiments. In some aspects of the techniques herein, a predictive network may use a collection of n-number of models $\{M_1, M_2, \ldots, M_n\}$ that operate on a time scale of T. In various embodiments, one or more devices in the network may execute a model scheduling process, to dynamically switch between the use of the different predictive models.

Figure 5A:
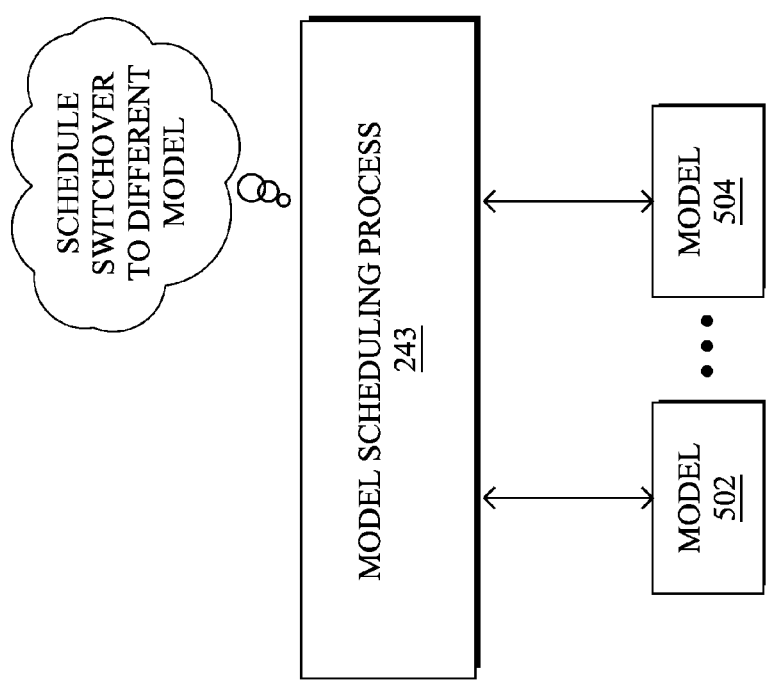
FIGS. 5A-5D illustrate an example of predictive models being scheduled.

As shown in FIG. 5A, model scheduling process 243 may schedule the switchover between the use of any of predictive models 502-504 (e.g., a first through nth predictive model) at a particular point in time. As would be appreciated, predictive models 502-504 may be used by any of learning machines 402-406 discussed above. For example, predictive models 502-504 may be used to analyze input from a given timeframe to make future predictions regarding the future traffic in the network, future network characteristics (e.g., in terms of delay, bandwidth, jitter, packet loss, etc.), or any other information that may be used to proactively route data in the network.

In various embodiments, model scheduling process 243 may itself use a supervisory, predictive model to determine when the use of any of predictive models 502-504 should be switched. In such cases, the time scale of the supervisory model may be much greater than that of predictive models 502-504. In some embodiments, an even greater number of hierarchies may be employed (e.g., by using one or more further models to oversee the supervisory model). In one embodiment, the supervisory model may be a Hidden Markov Model (HMM) whose hidden state is mapped to the collection of underlying models $M_1, M_2, \ldots, M_n$. Whenever model scheduling process 243 then detects a change in state or determines a state change is likely for one predictive model, model scheduling process 243 may request that another predictive model be used.

Figure 5B:
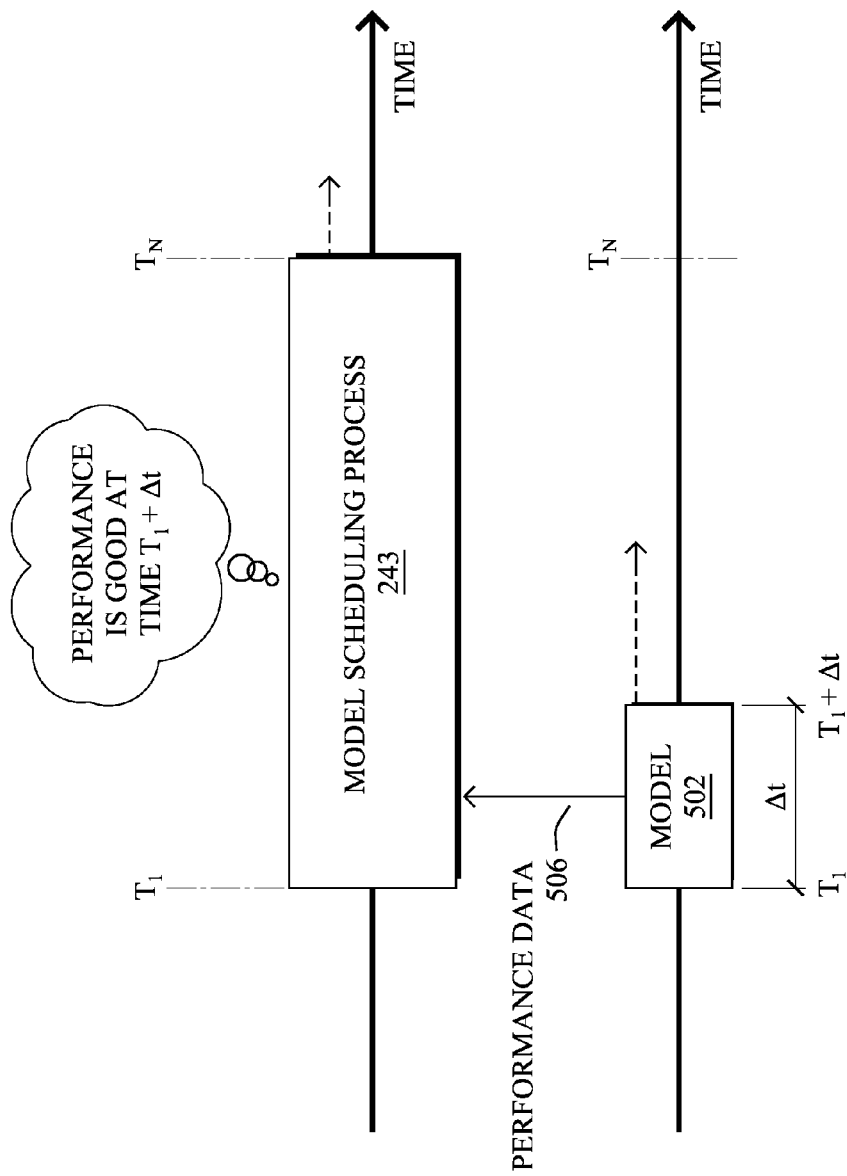

To determine when to cause a switchover between predictive models (e.g., by pushing a new model to a router, by generating an instruction to switch models, etc.), model scheduling process 243 may collect long-term performance statistics (e.g., the mean square error, etc.) of the predictive models. For example, as shown in FIG. 5B, assume that predictive model 502 analyzes input data collected over the past $\Delta t$ amount of time, to make predictions about the future state of the network. Thus, at time $t_1+\Delta t$, predictive model 502 may use its input data over the time period of $t_1$ to $t_1+\Delta t$, to make a prediction regarding the time period following time $t_1+\Delta t$. In various embodiments, predictive model 502 may quantify the amount of error in this prediction (e.g., based on the actual state of the network) and provide corresponding performance data 506 to model scheduling process 243.

Model scheduling process 243 may monitor performance data 506, to determine whether the performance of predictive model 502 satisfies one or more performance criteria. In various embodiments, the time scale of model scheduling process 243 may be much larger than that of predictive model 502, thereby analyzing input data over the course of the timespan from $T_1$ to $T_N$ (e.g., as opposed to only a subset of this timeframe, $\Delta t$). For example, model scheduling process 243 may use performance data 506 as input to its own supervisory model, to model the performance of predictive model 502. In some embodiments, model scheduling process 243 may use data mining techniques such as spectral analysis, to discover seasonal patterns in any performance changes of predictive model 502.

Figure 5C:
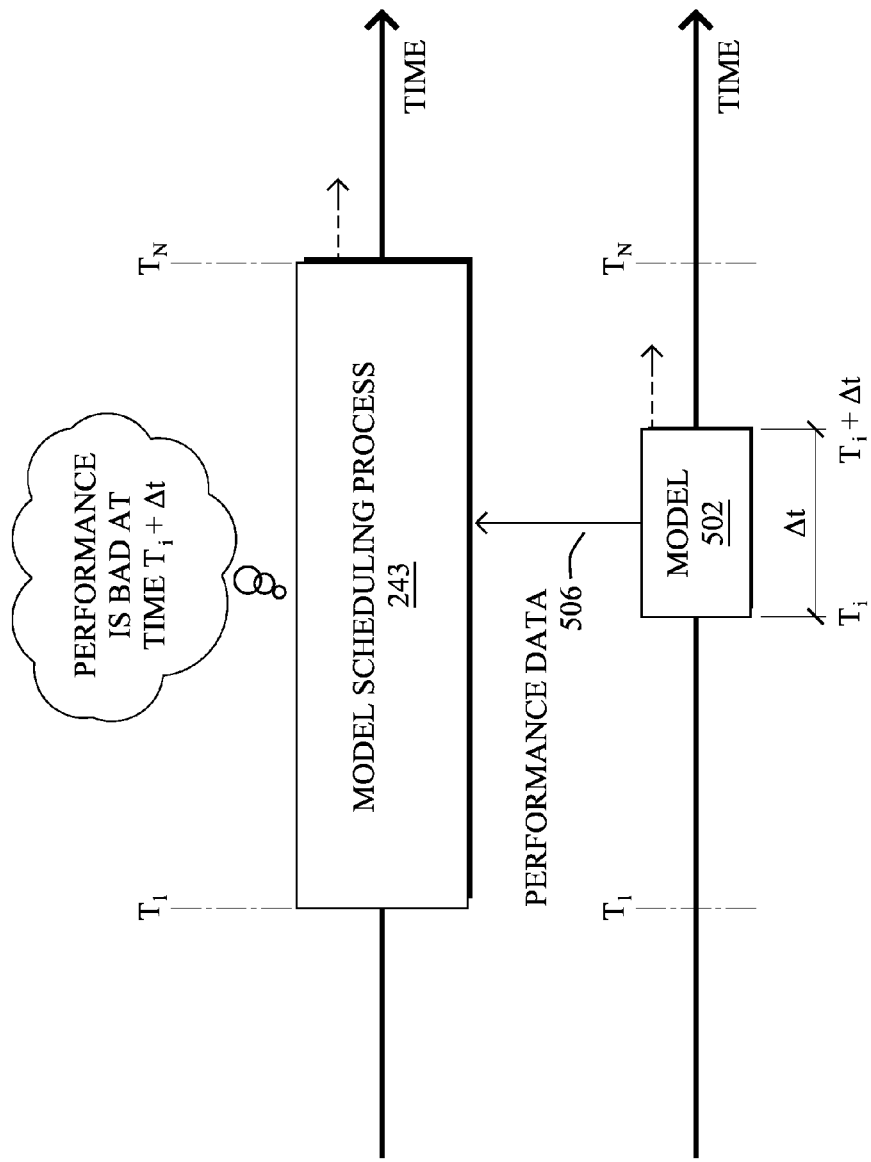

As shown in FIG. 5C, assume that model 502 begins experiencing poor performance when analyzing the time period of time $t_i$ to $t_i+\Delta t$. In such a case, model scheduling process 243 may identify the seasonality of the performance drop of predictive model 502 and cause a different predictive model to be used. For example, assume that the ability of predictive model 502 to predict traffic around New Year's Day decreases considerably. In such a case, model scheduling process 243 may identify New Year's Day as a period of poor performance of predictive model 502.

Figure 5D:
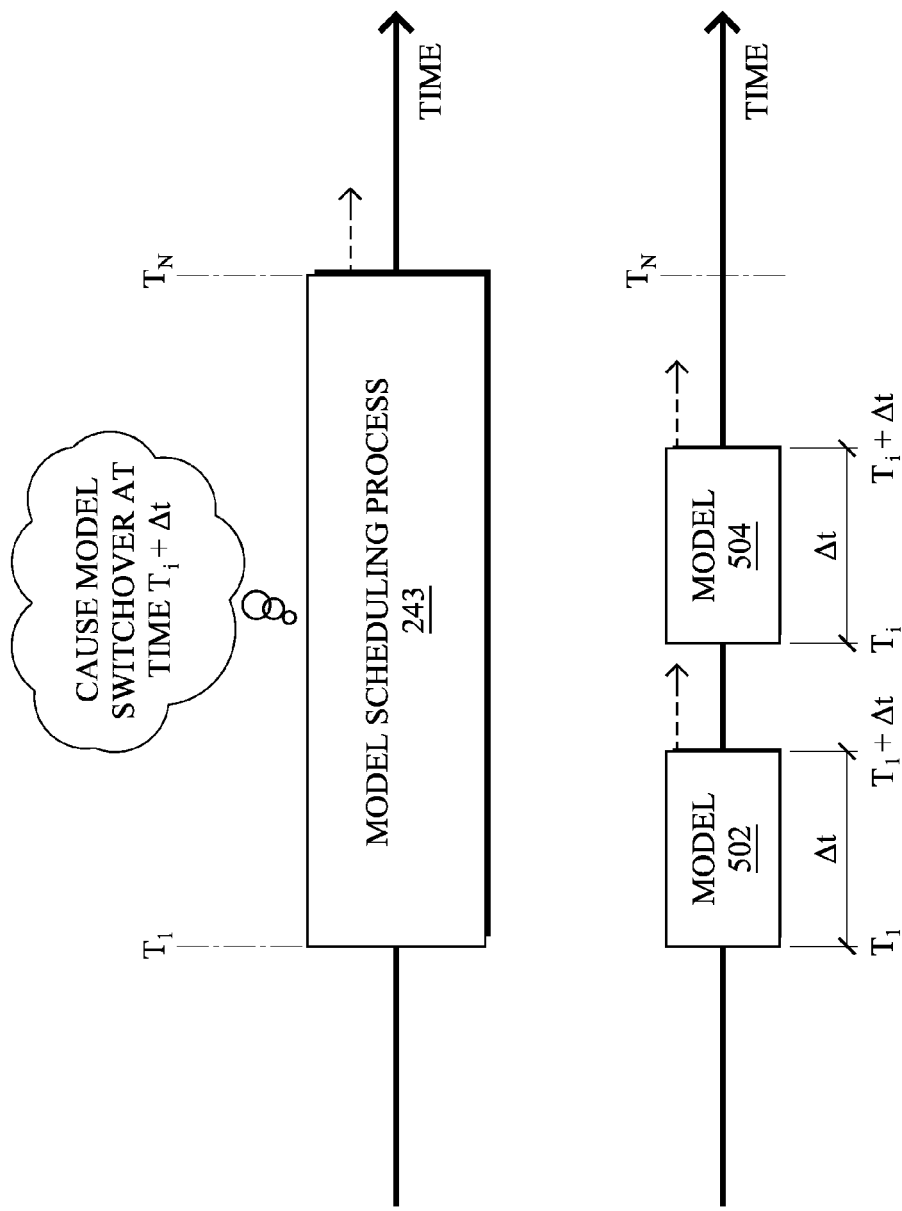

As shown in FIG. 5D, model scheduling process 243 may cause a switchover to occur in which predictive model 504 is used instead of predictive model 502, starting at a point in time that coincides with the period of poor performance of predictive model 502. In other words, model scheduling process 243 may predict that model 502 will exhibit poor performance during a certain, seasonal time period based on performance data 506 and, in turn, schedule the use of predictive model 504 instead during this time period. For example, if predictive model 502 experiences poor performance on New Year's Day, model scheduling process 243 may cause predictive model 504 to instead be used on this day, if predictive model 504 exhibits better performance during this time period.

As would be appreciated, model scheduling process 243 may be collocated with predictive models 502-504 (e.g., on an edge router) or, alternatively, executed by a supervisory/central network device such as an NMS or APIC. In the latter case, a custom protocol extension may be used that would allow model scheduling process 243 to dynamically push a new model $M_i$ to an edge router, and schedule its execution at a given time. Such a mechanism may reduce the computational cost at the edge router. Notably, model scheduling process 243 may require a much larger input data set to be accumulated over larger periods of time than that of predictive models 502-504, the analysis of which may also be more computationally expensive. Accordingly, model scheduling process 243 may be executed by a central networking device (e.g., NMS, etc.), in some embodiments, which may have greater resources than a typical router.

Figure 6A:
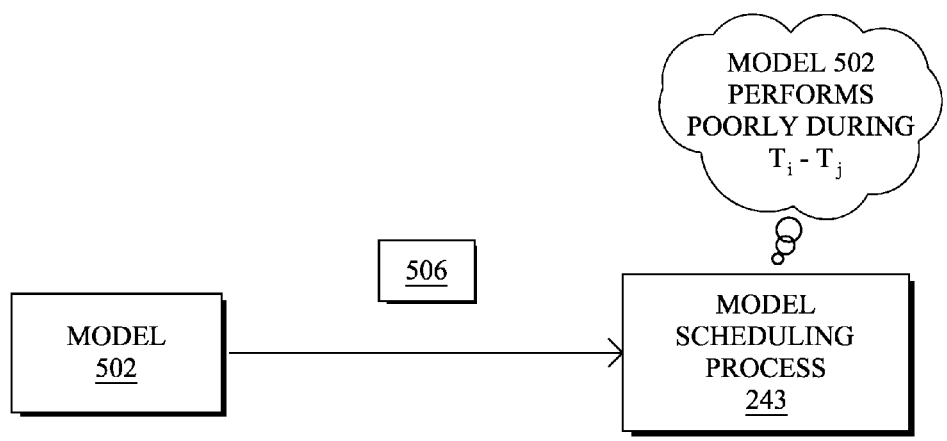
FIGS. 6A-6D illustrate an example of a new predictive model being trained.

Referring now to FIGS. 6A-6D, an example of a new predictive model being trained is shown, according to various embodiments. If the prediction error exhibits seasonal patterns (e.g., periodic peaks), model scheduling process 243 may initiate the training of a predictive model specifically targeted to these periods of decreased performance. For example, as shown in FIG. 6A, assume that performance data 506 from predictive model 502 indicates that model 502 performs generally well, but that its error systematically increases during weekends. In such a case, model scheduling process 243 may detect this pattern (e.g., after analyzing performance data 506 over a few weeks of operation. In response, model scheduling process 243 may cause a new model (e.g., model 504) to be trained using input data collected only during weekends.

Figure 6B:
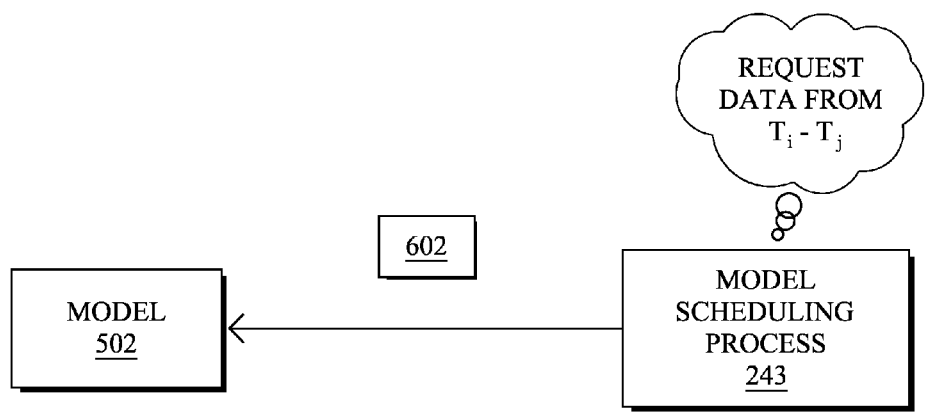

As shown in FIG. 6B, if model scheduling process 243 determines that the performance of predictive model 502 indicated by performance data 506 falls below a predefined threshold, it may send a retrieval request 602 to model 502 for the corresponding data. For example, request 602 may indicate the time period during which predictive model 502 experienced poor performance. In particular, request 602 may be sent to retrieve the time stamped data used as input to predictive model 502 during the period of poor performance for purposes of performing a further, longer-trend analysis. As noted previously, predictive model 502 may typically be executed on a different device as that of model scheduling process 243, but may also be executed on the same device, in other implementations.

Figure 6C:
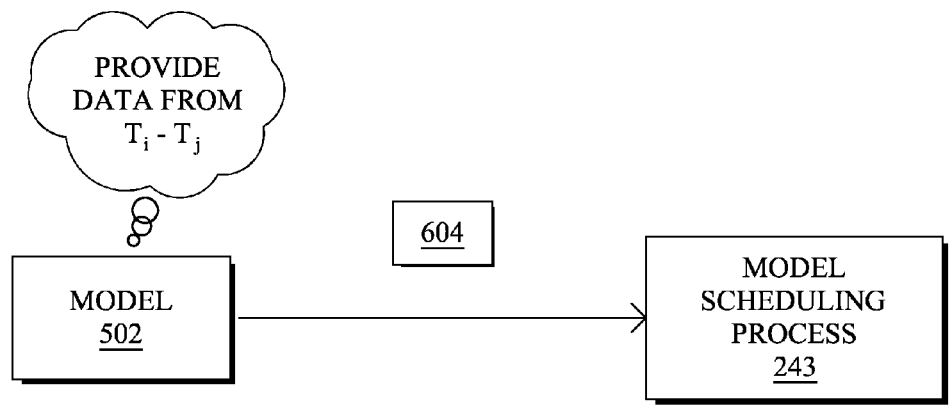

In response to receiving request 602, model 502 may provide the requested input feature data 604 back to model scheduling process 243, as shown in FIG. 6C. In one embodiment, input feature data 604 may be uncompressed and include all of the input features for the requested time period(s). In another embodiment, model 502 may employ a degree of compression to input feature data 604, prior to sending to model scheduling process 243. For example, model 502 may extract out any features that may be of interest (e.g., by excluding feature data that did not experience a threshold amount of change during the period of poor performance), thereby reducing the size of input feature data 604 sent to model scheduling process 243.

Figure 6D:
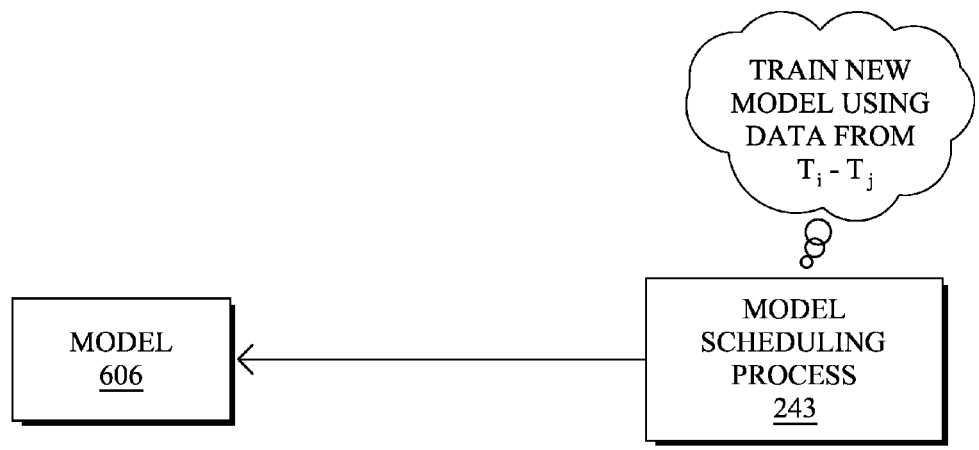

As shown in FIG. 6D, model scheduling process 243 may use input feature data 604 to train a new predictive model 606 that is specifically trained for the time period of poor performance. For example, if model scheduling process 243 receives a notification of poor predictive performance from various models during Black Friday, model scheduling process 243 may retrieve the corresponding input feature data from the models and compute a new model specific to Black Friday. Once model 606 is generated, model scheduling process 243 may upload the new model 606 and its schedule (e.g., every Black Friday, etc.) to any of the relevant devices in the network, thereby causing the devices to switch to using model 606 at the specified time. For example, model scheduling process 243 may provide model 606 and its schedule to the devices as a custom multicast message or via a set of unicast messages. Such models may also be exchanged among other edge devices/routers in other branches, if they have not deployed this dynamic multi-model functionality.

Referring again to FIGS. 5A-5D, models 502-504 and/or model scheduling process 243 may also use a real-time, change point detection mechanism (e.g., sequential analysis), to detect any drastic and significant changes in performance data 506, in some embodiments. For example, if the prediction error of model 502 suddenly increases beyond a threshold amount, model scheduling process 243 may take any number of corrective measures, immediately, in addition to attempting to avoid such errors in the future (e.g., by scheduling the use of a different predictive model). In one embodiment, model scheduling process 243 may provide an alert to a user interface device, to alert a network operator as to the performance change.

In further embodiments, one or more of models 502-504 may be designated as a default/backup model that should be used in cases in which the performance of the current model is below an acceptable threshold. For example, one of models 502-504 may be a user-defined policy received by the device via a user interface. Typically, such a model may be much more conservative than the current predictive model (e.g., by predicting out to a shorter timeframe, etc.). For example, as shown in FIG. 5D, model scheduling process 243 may cause the immediate switchover to model 504, if model 504 is the default/backup model.

Figure 7:
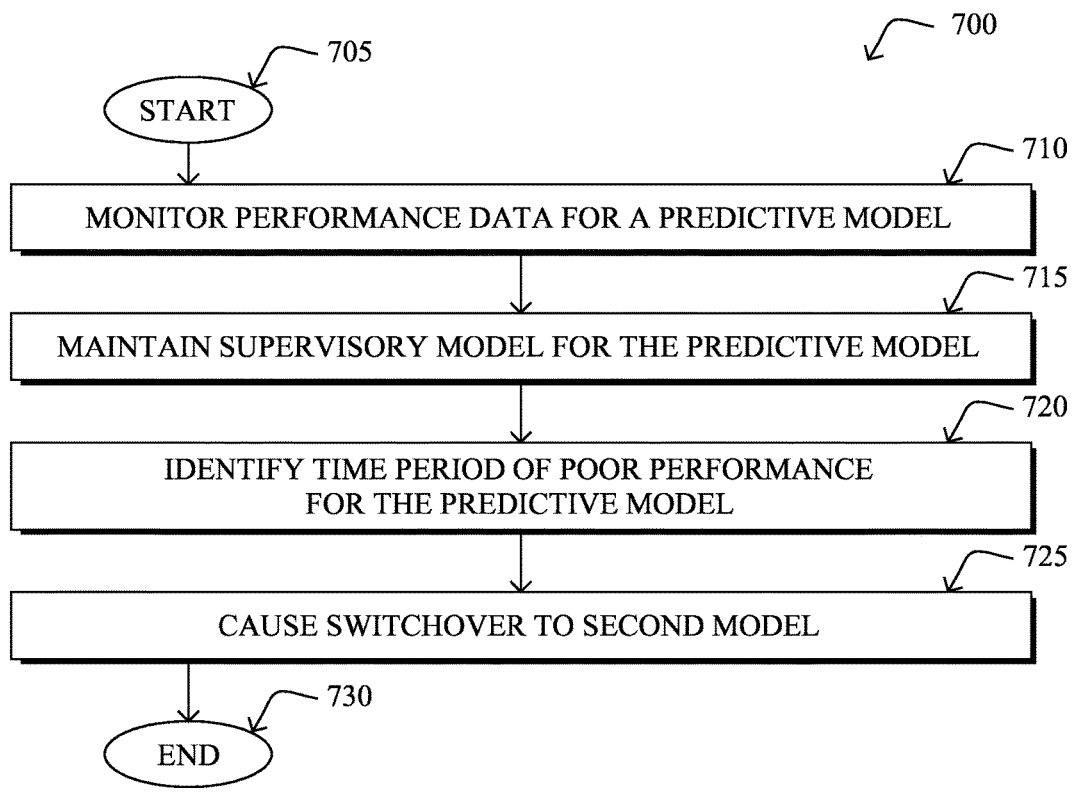
FIG. 7 illustrates an example simplified procedure for scheduling the use of predictive models.

FIG. 7 illustrates an example simplified procedure for scheduling the use of predictive models, in accordance with the embodiments herein. Procedure 700 may begin at step 705 and continue on to step 710 where, as described in greater detail above, a device in a network monitors performance data associated with one or more predictive models. In various embodiments, the predictive model(s) may be used as part of a predictive/proactive routing mechanism in the network. For example, a predictive model may employ a time series of observations regarding the state of the network (e.g., the traffic in the network, the available bandwidth, the amount of jitter, etc.), to predict a future state of the network. This prediction may then be used to proactively make decisions in the network, as opposed to doing so reactively (e.g., after a problem occurs). For example, the prediction may be used to make proactive routing decisions, traffic shaping decisions, etc. The performance data from the predictive model may include any metrics that indicate how well the model is able to make correct predictions. For example, the performance data may include a mean square error value or the like, that quantifies the prediction errors.

At step 715, as described in greater detail above, the device maintains a supervisory model for the predictive model(s) of step 710. In various embodiments, the supervisory model may use the performance data for the predictive model, to predict a future performance of the predictive model. For example, the supervisory model may be an HMM whose hidden state is mapped to the collection of one or more predictive models used in the network. In one embodiment, the supervisory model uses a time scale that is much greater than that of the predictive models that it supervises.

At step 720, the device identifies a time period of poor performance of the predictive model(s), as described in greater detail above. In particular, the device may use the supervisory model to identify a time period during which the predictive model is predicted to exhibit poor performance. For example, the supervisory model may identify a particular time of day, day of the week, etc. during which the predictive model historically exhibited poor performance. The device may use various techniques to identify the seasonality of this performance such as data mining, spectral analysis, etc.

At step 725, the device causes a switchover from the predictive model of step 710 to a second predictive model, as described in greater detail above. For example, the device may schedule the use of the second predictive model at a time associated with the period of poor performance by the first predictive model. In one embodiment, the second predictive model may be a preexisting model used in the network. In another embodiment, the device may cause the second model to be trained using input feature data specifically from the time period exhibiting poor performance. For example, if the predictive models of the network exhibit poor performance on New Year's Day, the device may request the input feature data for this day and, in turn, train a new model to be used on this day. Procedure 700 then ends at step 730.

Figure 8:
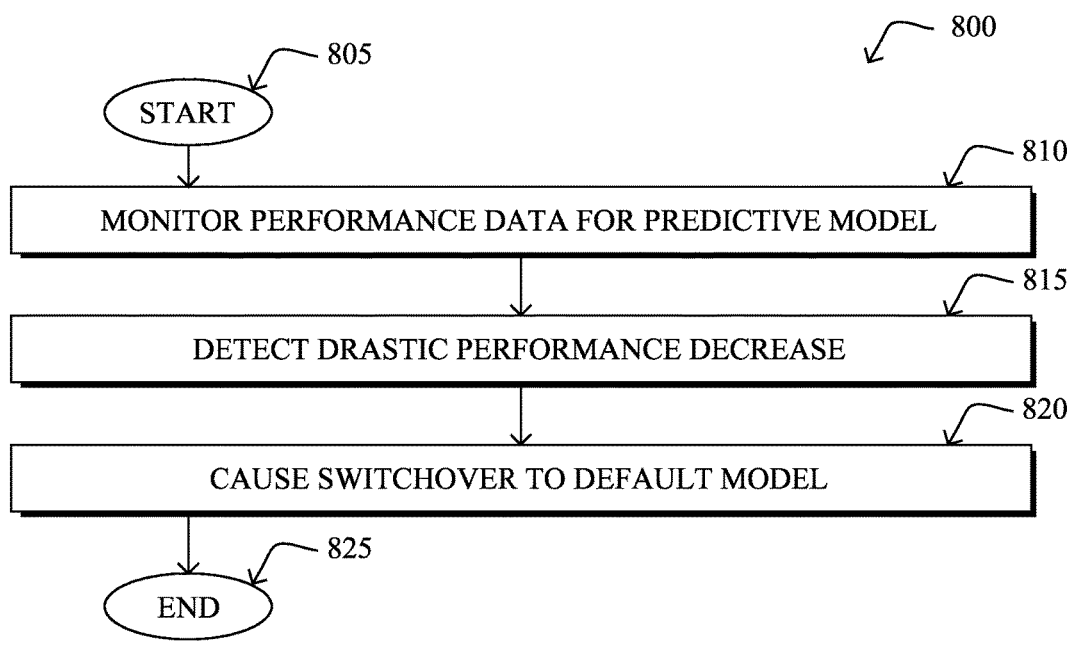
FIG. 8 illustrates an example simplified procedure for using a more conservative predictive model.

FIG. 8 illustrates an example simplified procedure for using a more conservative predictive model, in accordance with various embodiments herein. Procedure 800 may being at step 805 and continue on to step 810 where, as described in greater detail above, a device in a network monitors performance data for one or more predictive models. Such models may be used to make proactive routing decisions in the network based on predicted future network states. For example, as shown in FIG. 5B, the device may execute model scheduling process 243, to monitor performance data 506 of predictive model 502.

At step 815, the device detects a drastic performance decrease in the predictive model, as detailed above. In some embodiments, the device may use change point analysis to detect when the performance of the predictive model dips below an acceptable performance threshold. For example, if the mean square error of the model increases significantly, the device may take immediate corrective measures. In one embodiment, one corrective measure may correspond to the device providing an alert to a user interface device, to alert a network operator to the change.

At step 820, as described in greater detail above, the device may cause a switchover from the predictive model of step 810 to a default/backup model. Such a switchover may be immediate or may be scheduled for a predetermined point in time. In various embodiments, the default model may be more conservative than the predictive model experiencing poor performance. For example, the default model may correspond to a set of one or more user-defined parameters received via a user interface device that minimize the effects of the predictive model (e.g., by not making as severe predictions, etc.). Procedure 800 then ends at step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, schedule predictive models for machine learning systems. In particular, the techniques herein significantly increase the robustness of self-learning networks in the context of networks that are subject to variations at multiple time scales, that is, many real-world enterprise networks. Notably, for many years, service providers have manually created time-dependent policies based on observed traffic patterns. However, contrary to conventional approaches the techniques herein are completely automated and do not require any human to identify particular times of the day/week/year based on traffic profiles. Second, the techniques herein do not schedule static policies, but employ predictive models that constantly adjust the configuration of a device/router, thereby allowing for a reactivity and granularity impossible to achieve through manual configuration. Third, the techniques herein may detect "rare events" that cannot be anticipated by any human operator, thereby making the network much more dependable and robust.

While there have been shown and described illustrative embodiments that scheduling predictive models for machine learning systems, it is to be understood that various other adaptations and modifications may be made within the spirit and scope of the embodiments herein. For example, the techniques herein may be adapted for use within any kind of network using learning machines, and is not limited to those mentioned above. Additionally, the protocols discussed herein are exemplary only and other protocols may be used within the scope of the teachings herein. Further, while certain examples of time periods are described, other time periods may also be used (e.g., at the nano-second scale, at the yearly scale, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
monitoring, by a device in a network, performance data for a first predictive model, wherein the first predictive model is used to make proactive decisions in the network;
maintaining, by the device, a supervisory model based on the monitored performance data for the first predictive model;
identifying, by the device, a time period during which the supervisory model predicts that the first predictive model will perform poorly at a future time;
based on the identified time period, scheduling, by the device, a switchover from the first predictive model to a second predictive model at a point in time associated with the time period;
using, by the device, change point analysis to detect a change in the performance data for the first predictive model; and
causing, by the device, a switchover from the first predictive model to a default predictive model, in response to detecting the change in the performance data using change point analysis.

2. The method as in claim 1, further comprising:
causing, by the device, the second predictive model to be trained using input data associated with the time period and used as input to the first predictive model during the time period.

3. The method as in claim 2, further comprising:
requesting, by the device, the input data from a node in the network that executes the first predictive model.

4. The method as in claim 1, wherein the first predictive model predicts at least one of: a traffic pattern, a bandwidth, an amount of jitter, a retransmission rate, a packet loss rate, or an amount of delay in the network.

5. The method as in claim 1, wherein the supervisory model uses a time base that is greater than that of the first predictive model.

6. The method as in claim 1, wherein the supervisory model is a Hidden Markov Model.

7. The method as in claim 1, wherein the default predictive model corresponds to one or more rules received from a user interface device.

8. The method as in claim 1, further comprising:
providing, by the device, an alert to a user interface device, in response to detecting the change in the performance data using change point analysis.

9. An apparatus, comprising:
one or more network interfaces to communicate with a network;
a processor coupled to the one or more network interfaces and configured to execute a process; and
a memory configured to store the process executable by the processor, the process when executed operable to:
monitor performance data for a first predictive model, wherein the first predictive model is used to make proactive decisions in the network;
maintain a supervisory model based on the monitored performance data for the first predictive model;
identify a time period during which the supervisory model predicts that the first predictive model will perform poorly;
based on the identified time period, schedule a switchover from the first predictive model to a second predictive model at a point in time associated with the time period;
use change point analysis to detect a change in the performance data for the first predictive model; and
cause a switchover from the first predictive model to a default predictive model, in response to detecting the change in the performance data using change point analysis.

10. The apparatus as in claim 9, wherein the process when executed is further operable to:
cause the second predictive model to be trained using input data associated with the time period and used as input to the first predictive model during the time period.

11. The apparatus as in claim 10, wherein the process when executed is further operable to:
request the input data from a node in the network that executes the first predictive model.

12. The apparatus as in claim 9, wherein the first predictive model predicts at least one of: a traffic pattern, a bandwidth, an amount of jitter, a retransmission rate, a packet loss rate, or an amount of delay in the network.

13. The apparatus as in claim 9, wherein the supervisory model uses a time base that is greater than that of the first predictive model.

14. The apparatus as in claim 9, wherein the supervisory model is a Hidden Markov Model.

15. The apparatus as in claim 9, wherein the default predictive model corresponds to one or more rules received from a user interface device.

16. The apparatus as in claim 9, wherein the process when executed is further operable to:
provide an alert to a user interface device, in response to detecting the change in the performance data using change point analysis.

17. A tangible, non-transitory, computer-readable media having software encoded thereon, the software when executed by a processor on a device in a computer network operable to:
monitor performance data for a first predictive model, wherein the first predictive model is used to make proactive decisions in the network;
maintain a supervisory model based on the monitored performance data for the first predictive model;
identify a time period during which the supervisory model predicts that the first predictive model will perform poorly at a future time;
based on the identified time period, schedule a switchover from the first predictive model to a second predictive model at a point in time associated with the time period;
use change point analysis to detect a change in the performance data for the first predictive model; and
cause a switchover from the first predictive model to a default predictive model, in response to detecting the change in the performance data using change point analysis.

18. The computer-readable media as in claim 17, wherein the software when executed is further operable to:
cause the second predictive model to be trained using input data associated with the time period and used as input to the first predictive model during the time period.

* * * * *